UNITED STATES PATENT OFFICE.

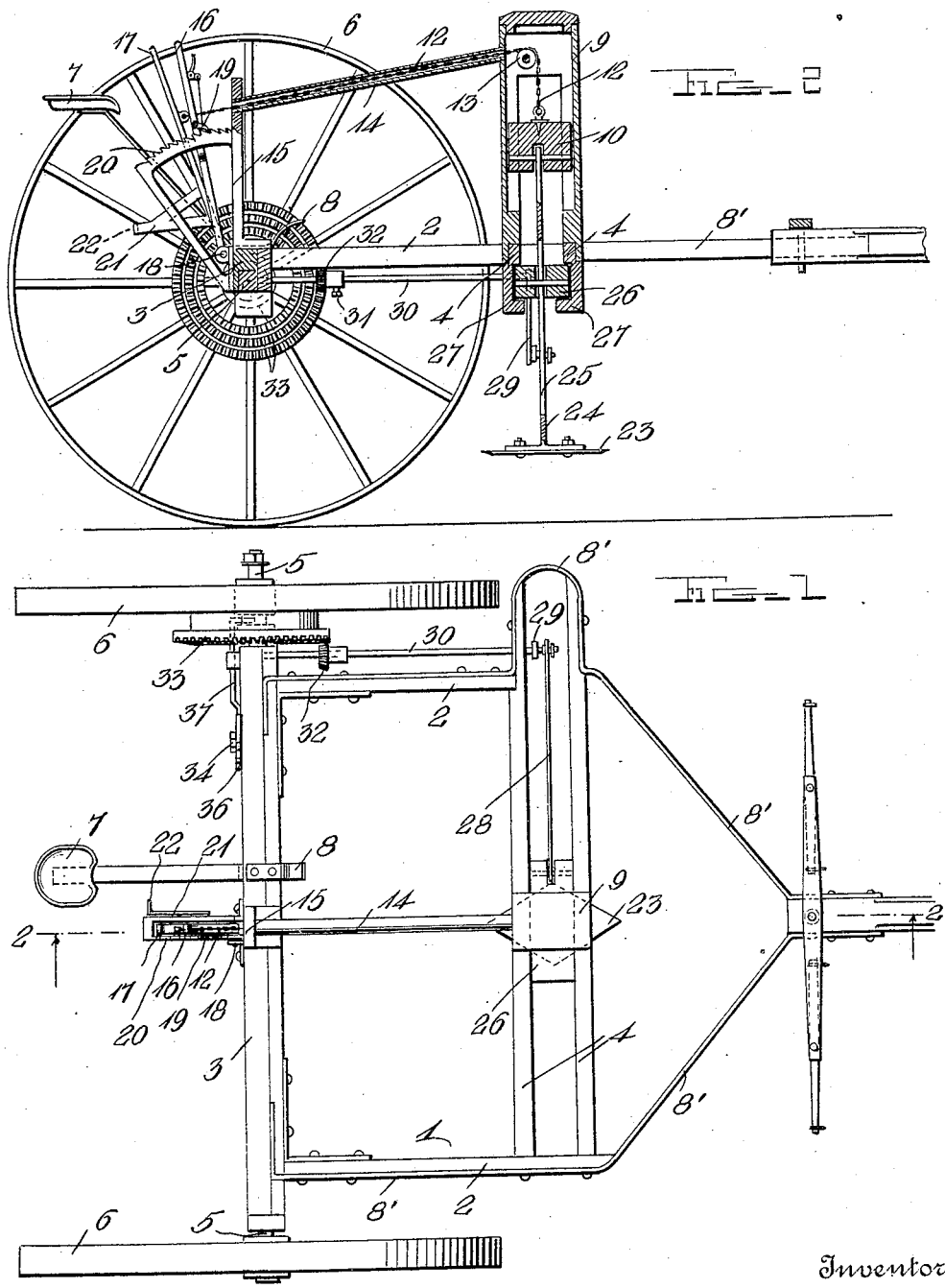

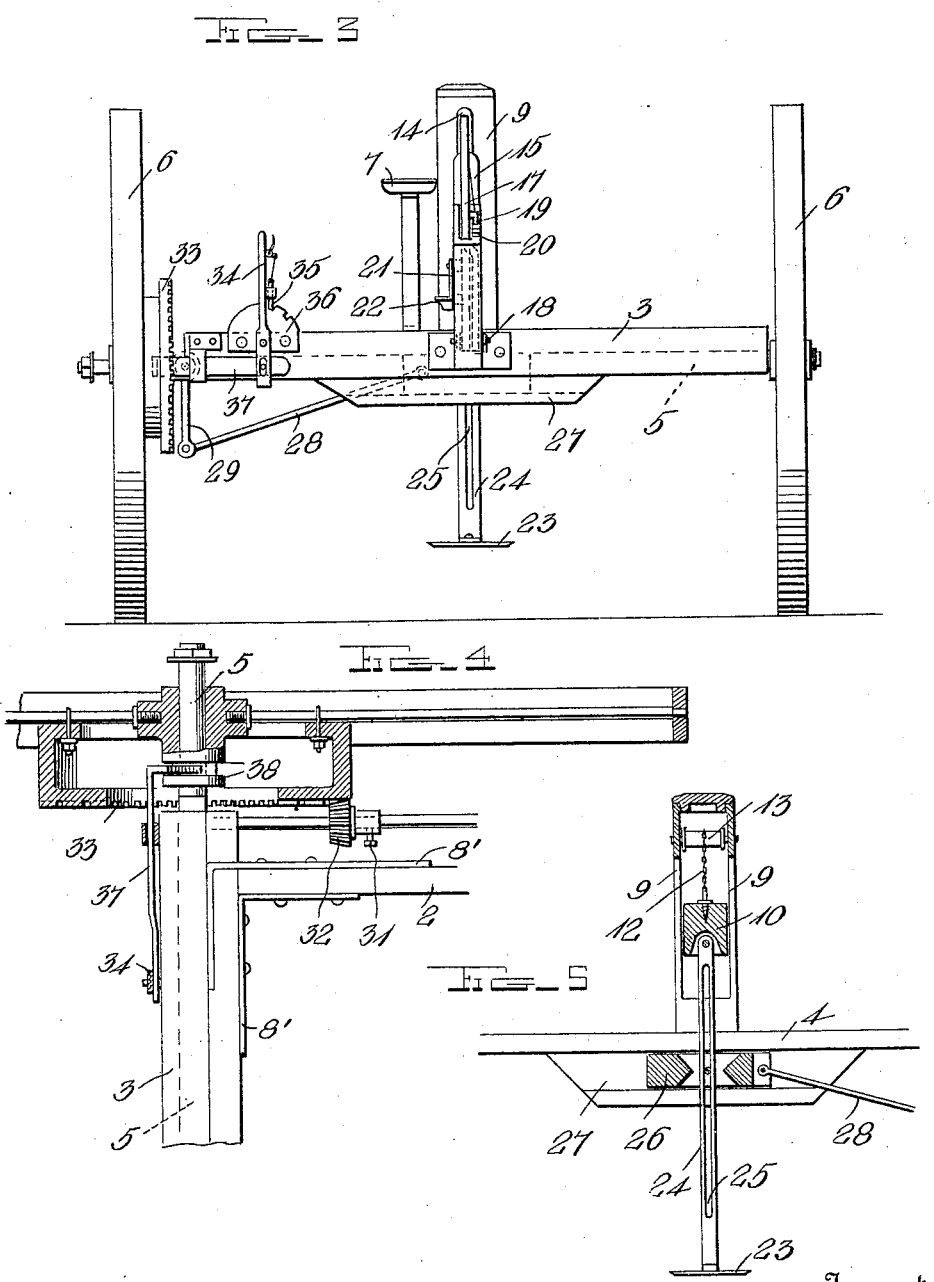

FREDERIC ABRAMS, OF ENNIS, TEXAS.

COTTON-CHOPPER.

No. 916,960.   Specification of Letters Patent.   Patented April 6, 1909.

Application filed December 14, 1908. Serial No. 467,404.

*To all whom it may concern:*

Be it known that I, FREDERIC ABRAMS, a citizen of the United States, residing at Ennis, in the county of Ellis and State of Texas, have invented certain new and useful Improvements in Cotton-Choppers; and I do declare the following to be a full, clear, and exact description of the invention, such as will enable others skilled in the art to which it appertains to make and use the same.

This invention relates to improvements in cotton choppers.

The object of the invention is to provide a device of this character having an improved means whereby the speed of the chopping hoe may be regulated and means whereby the hoe operating mechanism may be thrown into and out of gear.

A further object of the invention is to provide means whereby the hoe may be regulated to chop at different depths or held up entirely above the ground and means for temporarily raising the hoe out of engagement with any of the cotton in the rows which does not require thinning out.

With these and other objects in view, the invention consists of certain novel features of construction, combination and arrangement of parts as will be more fully described and particularly pointed out in the appended claims.

In the accompanying drawings, Figure 1 is a top plan view of a cotton chopper constructed in accordance with the invention; Fig. 2 is a longitudinal vertical sectional view on the line 2—2 of Fig. 1; Fig. 3 is a rear end elevation; Fig. 4 is an enlarged detail horizontal sectional view through one corner of the frame, the supporting and driving wheel and the speed regulating mechanism; and Fig. 5 is a vertical cross sectional view through the front of the frame and the hoe operating mechanism.

Referring more particularly to the drawings, 1 denotes the supporting frame comprising side bars 2, a rear cross bar 3, and a pair of front cross bars 4, said front cross bars being spaced apart for a purpose hereinafter described.

Fixedly mounted on the rear cross bar 3 is an axle 5 on the ends of which are revolubly mounted supporting wheels 6, one of which is employed as a driver for operating the chopping hoe. To the rear cross bar 3 is also secured a driver's seat 7 and a foot rest 8. The side and cross bars of the frame are suitably connected together and braced by brace rods 8′, said rods being extended beyond the front end of the machine to form draft members to which the draft tongue is secured.

Arranged on the front cross bars 4 midway between the side bars is an upwardly projecting guide frame 9 in which is slidably mounted a hoe supporting block 10. The block 10 is adjustably supported in the guide frame 9 by means of a chain or other flexible element 12 which passes over a guide pulley 13 mounted in the upper end of the frame 9. The chain 12 after passing over the pulley 13 extends rearwardly through a guide tube 14 which is arranged between the frame 9 and a supporting standard 15 secured to the rear cross bar 3. The rear end of the chain 12 passes through an adjusting lever 16 and is secured to a lifting lever 17. The levers 16 and 17 are pivotally mounted in a suitable bearing bracket 18 secured to the rear cross bar 3 and the lever 16 is provided with a locking pawl 19 which is engaged with a segmental rack 20 to hold the chopping hoe at the desired working position or entirely above and out of engagement with the ground. The lifting lever 17 is provided to temporarily lower and raise the chopping hoe independently of the adjusting lever whereby the hoe may be raised over such portions of the cotton which do not need thinning as the machine passes over the rows.

The lever 17 is adapted to be operated by hand or foot power said lever being provided with a rearwardly projecting bracket 21 on which is formed a foot piece or treadle 22 whereby the lever may be operated by the foot of the driver thus leaving both hands free for the management of the team or the manipulation of other levers. In the operation of the lever 16, the same is first swung into engagement with the lever 17 and both levers moved together to adjust the position of the hoe. The chopping hoe consists of a substantially diamond shaped plate or blade 23 which is secured on the lower end of the supporting standard 24 in which is formed a longitudinally disposed slot 25. The upper end of the standard 24 is pivotally connected to the adjusting block 10. The standard of the hoe passes through and is slidably engaged with an operating block 26 which is slidably mounted in suitable guide ways 27 secured to the under side of the front parallel cross bars 4 of the frame. The block 26 is operatively connected by a pitman rod 28 to a crank 29 fixed on the forward end of an operating shaft 30 which is journaled in suitable bearings in front and rear cross bars of the main frame, as shown. On the shaft 30 is adjustably secured as by means of a set screw 31 a beveled gear pinion 32 which is adapted to be engaged with a changeable speed gear 33 arranged on or suitably secured to the inner side of one of the supporting wheels 6, as shown. The gear 33 consists of a series of annular rows of gear teeth arranged one within the other so that the gear pinion 32 may be engaged with one or the other of said annular rows of teeth thereby varying the speed of the operating shaft and the movement of the chopping hoe which is swung back and forth across the rows of cotton by means of the crank 29 on said operating shaft.

In order to throw the operating mechanism out of gear, I provide a suitable shifting mechanism comprising a lever 34 which is pivotally mounted on the rear side of the cross bar 3 of the main frame and is provided with a pawl 35 to engage a segmental rack 36. The lever 34 has connected thereto one end of a shifting bar 37, the outer end of which is provided with a right-angularly bent forked or bifurcated end which is engaged with the hub of the wheel 6 between flanges 38 formed on said hub whereby when the lever 34 is operated in the proper direction, the wheel 6 is moved inwardly and outwardly on its axle thereby moving the gear 33 into and out of position to be engaged by the pinion 32 on the operating shaft, thus throwing the operating mechanism into and out of gear.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent is:

1. In a cotton chopper, the combination of a supporting frame, supporting wheels revolubly mounted thereon, a slidably mounted hoe adjusting block, a hoe adjusting lever and a hoe lifting lever operatively mounted on said supporting frame, means whereby the lifting lever may be operated by the driver, a flexible element secured at one end to said adjusting block and at its other end to said lifting lever, said flexible element passing through said adjusting lever, whereby said levers may be independently operated to temporarily lift and adjust said supporting block.

2. In a cotton chopper, a supporting frame, supporting wheels revolubly mounted thereon, a guide frame arranged on said supporting frame, a hoe adjusting block slidably mounted in said guide frame, a hoe adjusting lever and a hoe lifting lever operatively mounted on said supporting frame, means whereby said lifting lever may be operated by the driver, a flexible connection secured at one end to said adjusting block and at its opposite end to said lifting lever, said flexible connection passing through said adjusting lever whereby said levers are independently operated to temporarily lift and adjust said supporting block, a guide tube to inclose and protect said flexible connection, a hoe operating block, and means whereby said block is operated.

3. In a cotton chopper, a supporting frame, an axle secured thereto, supporting wheels revolubly mounted on said axle, a changeable speed gear arranged on one of said wheels, an adjustably mounted hoe supporting block, means to raise and lower said block, a chopping hoe pivotally connected to the latter, a guide way arranged in said frame, a hoe operating block slidably mounted in said guide way, said block having an operative connection with said hoe, a drive shaft, a crank on one end of said shaft, a pitman rod to connect said crank with said hoe operating block, a pinion adjustably mounted on said shaft and adapted to be engaged with said changeable speed gear whereby the speed of the shaft is regulated, and means to shift said changeable speed gear into and out of operative engagement with said pinion, whereby said shaft is thrown into and out of operation.

4. In a cotton chopper, a supporting frame, an axle secured thereto, supporting wheels revolubly mounted on said axle, a changeable speed gear arranged on one of said wheels, an adjustably mounted hoe supporting block, means to raise and lower said block, a chopping hoe pivotally connected to the latter, a guide way arranged in said frame, a hoe operating block slidably mounted in said guide way, said block having an operative connection with said hoe, a drive shaft, a crank on one end of said shaft, a pitman rod to connect said crank with said hoe operating block, a pinion adjustably mounted on said shaft and adapted to be engaged with said changeable speed gear whereby the speed of the shaft is regulated, a shifting lever pivotally mounted on said supporting frame, and a shifting bar connected at one end with said lever and having a loose connection at its opposite end with the hub of the supporting wheel on which said changeable speed gear is mounted whereby said supporting wheel and gear are shifted to move the latter into and out of engagement with the pinion of said drive shaft thereby throwing said shaft into and out of operation.

In testimony whereof I have hereunto set my hand in presence of two subscribing witnesses.

FREDERIC ABRAMS.

Witnesses:
ROBERT J. CALDWELL,
WYATT S. BROWN.